United States Patent

Karzmar et al.

[11] 4,119,859
[45] Oct. 10, 1978

[54] FUEL STORAGE RACK

[75] Inventors: Ronald C. Karzmar, Brighton; Robert H. Stamm, Canton, both of Mich.

[73] Assignee: Brooks & Perkins, Incorporated, Southfield, Mich.

[21] Appl. No.: 799,704

[22] Filed: May 23, 1977

[51] Int. Cl.² ............................................. G21F 5/00
[52] U.S. Cl. ................................... 250/507; 250/518
[58] Field of Search ..................... 250/506, 507, 518; 176/30, 87, 73, 84, 85, 87; 248/300; 211/71, 74

[56] References Cited

U.S. PATENT DOCUMENTS

| 4,010,375 | 3/1977 | Wachter et al. | 250/518 |
| 4,024,406 | 5/1977 | Bevilacqua | 250/518 |
| 4,034,277 | 7/1977 | Soot | 250/518 |
| 4,039,842 | 8/1977 | Mollon | 250/518 |

Primary Examiner—Alfred E. Smith
Assistant Examiner—Anderson B. C.
Attorney, Agent, or Firm—Whittemore, Hulbert & Belknap

[57] ABSTRACT

Spline connector for interconnecting adjacent corners of diagonally adjacent rectangular nuclear fuel cell modules are provided with a novel shape including only two attachment arms to permit assembly of a multiplicity of rows of fuel cells while affording access to the edges of the splines for welding them to the storage modules.

11 Claims, 6 Drawing Figures

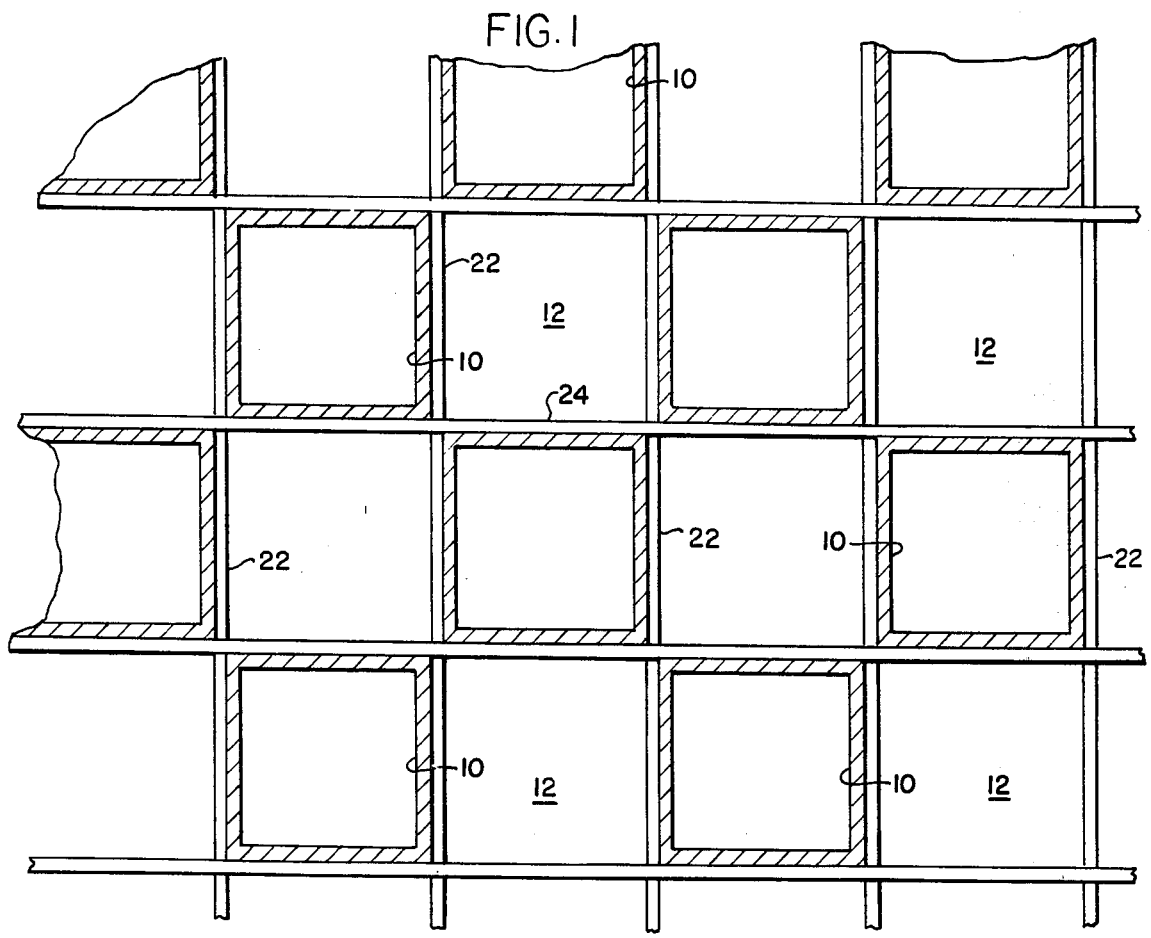
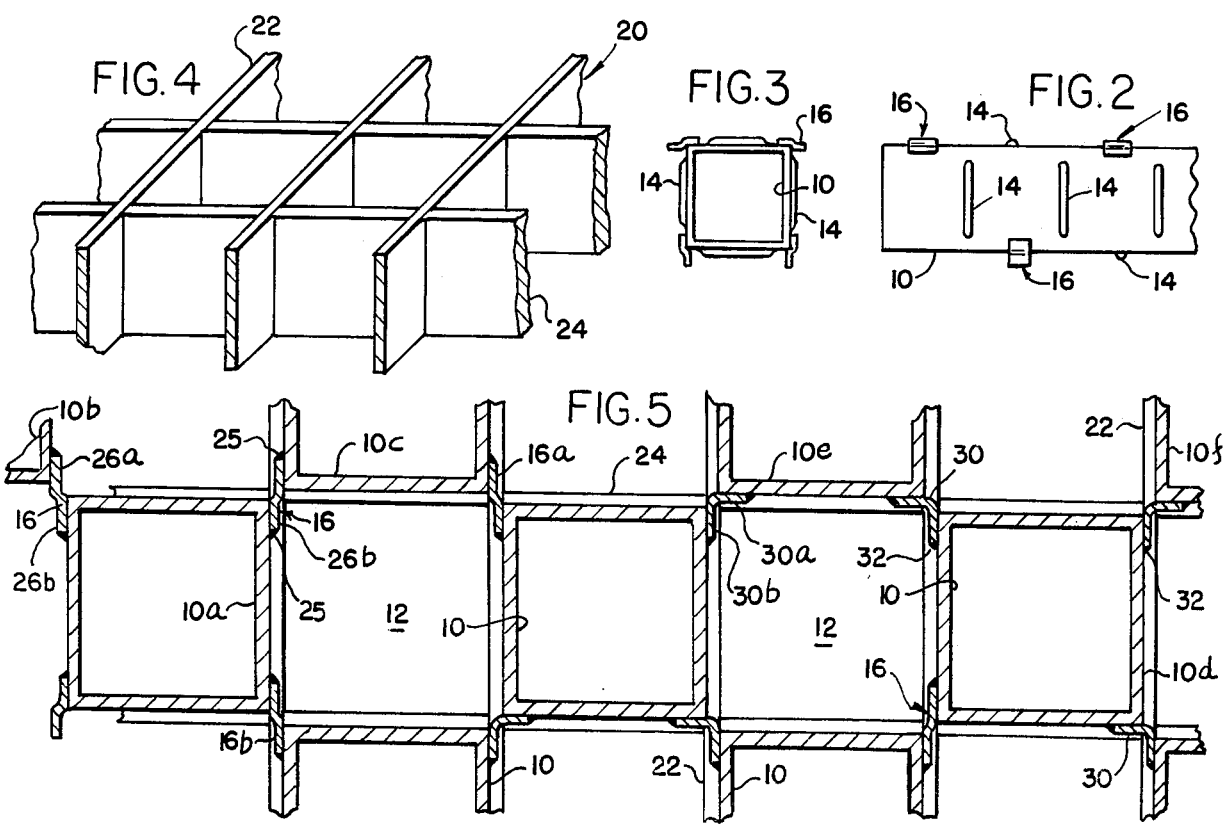

FUEL STORAGE RACK

BRIEF SUMMARY OF THE INVENTION

The present invention is an improvement over the construction shown in copending Mollon application Ser. No. 794,955, filed May 9, 1977, relating to a storage rack built up of a multiplicity of elongated square cross section tubular modules for storing spent nuclear fuel cells or bundles of such cells in a storage pool.

The prior construction interconnects adjacent corners of the storage modules (except at the outer sides of the assembly) with X-shaped splines having four arms, two of which are adapted to be welded to the sides of one of the storage modules adjacent the corner thereof. While this arrangement produces a very efficient construction, difficulty is encountered due to lack of free access to the edges of the splines as the assembly of fuel modules is built up.

In accordance with the present invention, splines of a novel construction are provided which permits welding of the splines to the outer walls of diagonally adjacent modules as the rack is built up.

BRIEF DESCRIPTION OF THE DRAWINGS

FIG. 1 is a fragmentary horizontal sectional view of an assembly of fuel cells arranged in a checkerboard arrangement and illustrating an egg crate lattice support structure.

FIG. 2 is a fragmentary elevational view of a single fuel cell storage module with attaching brackets or splines secured thereto.

FIG. 3 is an end view of the module shown in FIG. 2.

FIG. 4 is an enlarged perspective view of an egg crate lattice support structure.

FIG. 5 is a horizontal sectional view through a storage rack and through the splines interconnecting adjacent storage modules.

DETAILED DESCRIPTION

Referring to FIG. 1, the storage rack for spent nuclear fuel cells comprises a multiplicity of elongated square cross section storage modules 10 which are arranged in a checkerboard arrangement with open spaces 12 provided between adjacent diagonally disposed fuel cells. The individual storage modules 10 are preferably of the type disclosed in Mollon U.S. Pat. No. 4,006,362 and each side wall of a storage module is in the form of a sandwich containing a material intermediate the inner and outer walls which includes a material effective to capture slow neutrons. A material suitable for this purpose is a boron compound such, for example, as boron carbide.

The individual fuel cell storage modules may be as illustrated in FIGS. 2 and 3 where each module 10 is provided with reinforcing ribs 14 in its sides and which at its corners is provided with elongated splines 16. In FIG. 2 the splines are illustrated as relatively short, but if preferred the splines may be elongated so as to extend for approximately half the length of each storage module, the adjacent ends being separated to provide space for the reticulated lattice or egg crate support structure as will presently be described.

Referring now to FIG. 4, there is shown a fragment of the lattice or grid 20 comprising spaced apart strips 22 interconnecting with crossing strips 24. These strips at the crossing point may be provided with cooperating notches in order to provide the egg crate construction illustrated.

It will be observed in FIG. 1 that the strips 22 and 24 require diagonally adjacent modules 10 to be offset slightly to accommodate the width of the strips 22 and 24.

Due to the notched interconnection between the strips 22 and 24, a strong support structure is provided which will retain the fuel storage modules in assembled relation. In practice the bottom ends of the modules are welded or otherwise rigidly secured to a floor plate supported from the bottom of the storage pool.

It is essential that the storage modules be assembled into a rigid rack capable of being handled as a structural unit and for this purpose elongated splines such as illustrated at 16 are provided. Splines 16 are illustrated in FIG. 2 as relatively short, but it will be appreciated that if desired they may be elongated so as to provide a rigid connection between adjacent corners of diagonally adjacent fuel cells which extends in total substantially through the length of the fuel cell storage modules. It may be mentioned that the fuel cells have a length in excess of 14 feet.

One of the problems of assembling a large number of elongated storage modules in the checkerboard configuration illustrated in FIG. 1 is that as additional storage modules are added to the assembly, difficulty is encountered in affording access to the edges of the connecting splines to carry out the weld connections illustrated at 25. In accordance with the present invention, splines or brackets 16 having the cross sectional shape illustrated at the left in FIG. 5 are provided. These splines or brackets are characterized by the provision of two arms 26a and 26b. It will be observed that in order to add the storage module 10a seen at the left of FIG. 5 to the previously assembled modules 10b and 10c, the arms 26a of the brackets 16 may be welded to the side walls of the modules 10b and 10c as indicated at 25 prior to assembly of the modules 10b and 10c into the array of other modules.

The module 10a may, if desired, have the brackets or splines 16b welded thereto prior to its assembly into the arrangement of modules. Module 10a may now be moved into position adjacent the modules 10b and 10c in the relationship illustrated in FIG. 5, at which time access is available to carry out welds 25 of arms 26b. It will be noted that prior to the addition of the modules 2 at the bottom of FIG. 5, access to provide the welds 25 between the arms 26b and the sidewalls of the module 10a is provided by the space between the sides of the module 10a and the adjacent modules spaced therefrom in the same horizontal row.

With this arrangement the addition of storage modules may be continued to build up an array of any convenient size while permitting welding of the edges of the splines or brackets 16 to the newly added storage module.

Referring now to the right of FIG. 5, it will be observed that brackets 30 are provided, each bracket having an arm 30a and an arm 30b disposed to form a spline or bracket of generally L-shaped cross section. With this arrangement it is evident that the storage module 10d may be added to the arrangement and suitably interconnected to previously integrated modules 10e and 10f while affording access to provide the welds 32. The splines or brackets 30 may be welded to the modules 10e and 10f in the relationship shown before the last noted modules are attached to the assembly. Similarly, the new storage module 10d which is to be added to the assembly may be provided with splines or brackets 16 (of the type seen at the left in FIG. 5) or 30. The module 10d may now be moved into the position illustrated at the right of FIG. 5 intermediate the arms 30b of brackets 30. At this time, full access to the brackets is available through the open spaces 12 in the assembly so that the efficient provision of the welds 32 may be accomplished.

It will be observed that the brackets 16 have the two arms 26a and 26b extending in opposite directions but laterally offset sufficiently to provide for assembly of the egg crate lattice 20 into the assembly.

Brackets or splines 30 are of L-shaped cross section and, of course, similarly permit attachment of the brackets to the modules in an offset relation which permits the strips 22 and 24 of the lattice 20 to pass between assembled storage modules.

From the foregoing it will be apparent that the present invention makes possible a novel method of assembly and more particularly the addition of modules to a previously assembled partial array.

The essential feature of the method is the provision of projecting arms of brackets attached to the outermost modules of a partially completed array. The added module is moved into the space between the arms on spaced-apart but adjacent previously assembled modules. Thus the added module closes the previously open side of the space between two of the adjacent previously assembled modules. At the same time the position of the added module, with spaces at both sides thereof, affords access to permit the workmen to complete the attachment of the bracket arm to the corner portion of the added module. This is usually accomplished by welding, and where the brackets extend for substantially half the length of the modules, the welding operation is preferably carried out while the modules of the array extend horizontally.

As an added advantage, brackets may be attached to a module which is to be added to the array to extend from the side thereof which is to be the outer side in the array. Thus, after each module is added to the array, its permanent assembly into the array is completed by making only two welds after moving the added module into position.

It will be recalled that while the brackets may be relatively short, they may also extend substantially completely from the base of the rack to the intermediate lattice and from the intermediate lattice to the top lattice.

It will be noted that each bracket is formed of strip material of uniform thickness by simple bending operations.

In all cases the bracket arms which receive and are welded to a module added to the array of previously assembled modules are spaced apart in pairs to engage opposite sides of an added module. Where the L-shaped brackets are used, they can be welded to both the previously assembled modules and to the added module upon addition. What I claim as my invention is:

1. A storage rack for receiving spent nuclear fuel cells comprising a multiplicity of parallel elongated tubular storage modules of generally rectangular cross-section which in use extend vertically, said modules being open at the bottom ends thereof and having flat sides incorporating a neutron absorbing material, said modules being disposed in an array which in horizontal section forms a checkerboard pattern in which all modules are arranged in a first series of adjacent parallel rows and a second series of adjacent parallel rows perpendicular to the first series, in which in each row the modules occupy only alternate squares of the pattern and leave the remaining squares vacant, and in which in adjacent parallel rows the modules are staggered, whereby at the interior of the array, each module has four modules disposed diagonally adjacent the corners thereof and has four open spaces adjacent the flat sides thereof, a bracket connecting each module to the diagonally adjacent modules, each bracket being elongated in the direction of the length of the modules and consisting of two arms which extend laterally from the intermediate portion of said module, one arm of each of said brackets being welded to a side of diagonally adjacent modules adjacent the corners thereof, each module at the interior of the array having the brackets at a side thereof located outwardly from the inner portion of the array which have arms extending outwardly of the array, the pair of bracket arms at the adjacent outer corners of a pair of adjacent spaced apart inner modules being spaced apart to engage the opposite sides of a single added module placed therebetween to substantially close the side of the open space between said pair of adjacent inner modules, whereby the outwardly extending arms of said pair of brackets are readily accessible for effecting attachment thereof to the sides of said added module in the open spaces to the sides of said added module.

2. The rack as defined in claim 1, in which a lattice is provided with interconnected crossing strips, one of said strips extending continuously across the array of modules between adjacent parallel rows of spaced apart modules, said pair of arms being disposed to provide for lateral spacing between adjacent rows of modules to accommodate said strips.

3. The rack as defined in claim 1, said brackets each having two arms thereof extending generally in opposite directions but laterally offset from each other for attachment to side portions of said modules adjacent the corners thereof to provide for the spacing of modules to accommodate said strip.

4. The rack as defined in claim 1, said brackets each having two arms thereof extending generally at right angles to each other to provide for the spacing of modules to accommodate said strip.

5. The rack as defined in claim 1, in which said brackets are welded to said modules and in which the access is for the purpose of welding successively added modules into the array.

6. The rack as defined in claim 1, in which said brackets are formed of uniform thickness strip material bent into the required shape along longitudinal axes to form the aforesaid arms.

7. The rack as defined in claim 6, in which the edges of said strip material are generally oppositely extending but laterally offset as required to accommodate said strips between rows of modules.

8. The rack as defined in claim 6, in which the edges of said strip material are bent to extend generally at right angles, to provide for attachment of the inner arms to the outwardly facing sides of inner modules and to the lateral sides of the added module.

9. The method of building up a storage rack for receiving elongated spent nuclear fuel cells comprising a multiplicity of elongated tubular storage modules of generally square cross-section, each module being open at its bottom end and having flat sides incorporating a neutron absorbing material, said modules being disposed vertically in parallelism in use in an array which in a horizontal section is a checkerboard pattern in which all modules are arranged in a first series of adjacent parallel rows and a second series of adjacent parallel rows perpendicular to the first series, in which in each row the modules occupy only alternate squares of the pattern and leave the remaining squares vacant, and in which in adjacent parallel rows the modules are staggered, whereby at the interior of the array each module has four modules diagonally disposed adjacent the corners thereof and has four open spaces adjacent the flat sides thereof, brackets rigidly interconnecting adjacent corner portions of diagonally adjacent modules, each bracket being elongated and having only two arms which extend divergently from an intermediate portion, one arm of each bracket being attached in assembly to extend outwardly from adjacent an outer corner of a previously assembled module into position to provide a pair of spaced arms extending outwardly from the array of modules from adjacent corner portions of adjacent modules spaced apart in a row to engage the sides adjacent the corners thereof of an additional module added to the array of modules and to afford ready access to the arms for attachment thereof to the side of the additional module, the method comprising attaching brackets to the modules of an outer row in a array of spaced modules to provide arms which project outwardly of the array therefrom adjacent the corners thereof, adding an additional module to the array in position to close the space between a pair of previously assembled modules and to be received between the pair of laterally projecting brackets arms at the corners of adjacent spaced modules to provide access to the projecting arms at the sides of the added module, and fixedly attaching said arms to the additional module.

10. The method as defined in claim 9, which comprises attaching the bracket arms to the added module by welding.

11. The method as defined in claim 9, which comprises welding brackets to the additional module to project laterally beyond the side thereof which is to be the outer side as assembled prior to moving the additional module into position between the arms projecting from the previously assembled modules.

* * * * *